United States Patent

[11] 3,603,094

[72] Inventor  Lionel Henry Townend
               Farnborough, England
[21] Appl. No. 841,068
[22] Filed     July 11, 1969
[45] Patented  Sept. 7, 1971
[73] Assignee  Minister of Technology in Her Britannic
               Majesty's Government of the United
               Kingdom of Great Britain and Northern
               Ireland
               London, England
[32] Priority  July 15, 1968
[33]           Great Britain
[31]           33,543/68

[54] AIRCRAFT FLUID JET REACTION ENGINES
     8 Claims, 1 Drawing Fig.
[52] U.S. Cl. ........................................... 60/261,
                                                          60/271
[51] Int. Cl. ......................................... F02k 1/00,
                                                          F02k 3/10
[50] Field of Search ................................. 60/231,
                                                 261, 270, 271

[56]              References Cited
              UNITED STATES PATENTS
2,653,445  9/1953   Halford et al. ..............  60/261 X
2,952,123  9/1960   Rich ..........................  60/231
3,010,280  11/1961  Hausmann ....................  60/271 X
3,034,294  5/1962   Brown ........................  60/271 X
3,132,476  5/1964   Conrad .......................  60/231 X
3,363,421  1/1968   Ferri .........................  60/270 X Primary Examiner—Al Lawrence Smith
Attorney—Stevens, Davis, Miller & Mosher ABSTRACT: An aircraft fluid jet reaction engine having an exhaust nozzle which has means for supplying fuel to form a combustible mixture with the local atmosphere which is ignited by contact with the hot gas efflux from the exhaust nozzle and is burnt externally of said gas efflux. The burning mixture raises the static pressure at the region downstream and adjacent the exhaust nozzle thus reducing base drag and also acts to suppress noise from the gas efflux.

Igniter means are provided for initiating and maintaining combustion.

Fuel to form the combustible mixture is fed through fuel nozzles, in the engine structure at its downstream end, and upstream thereof both externally and internally of the exhaust nozzle.

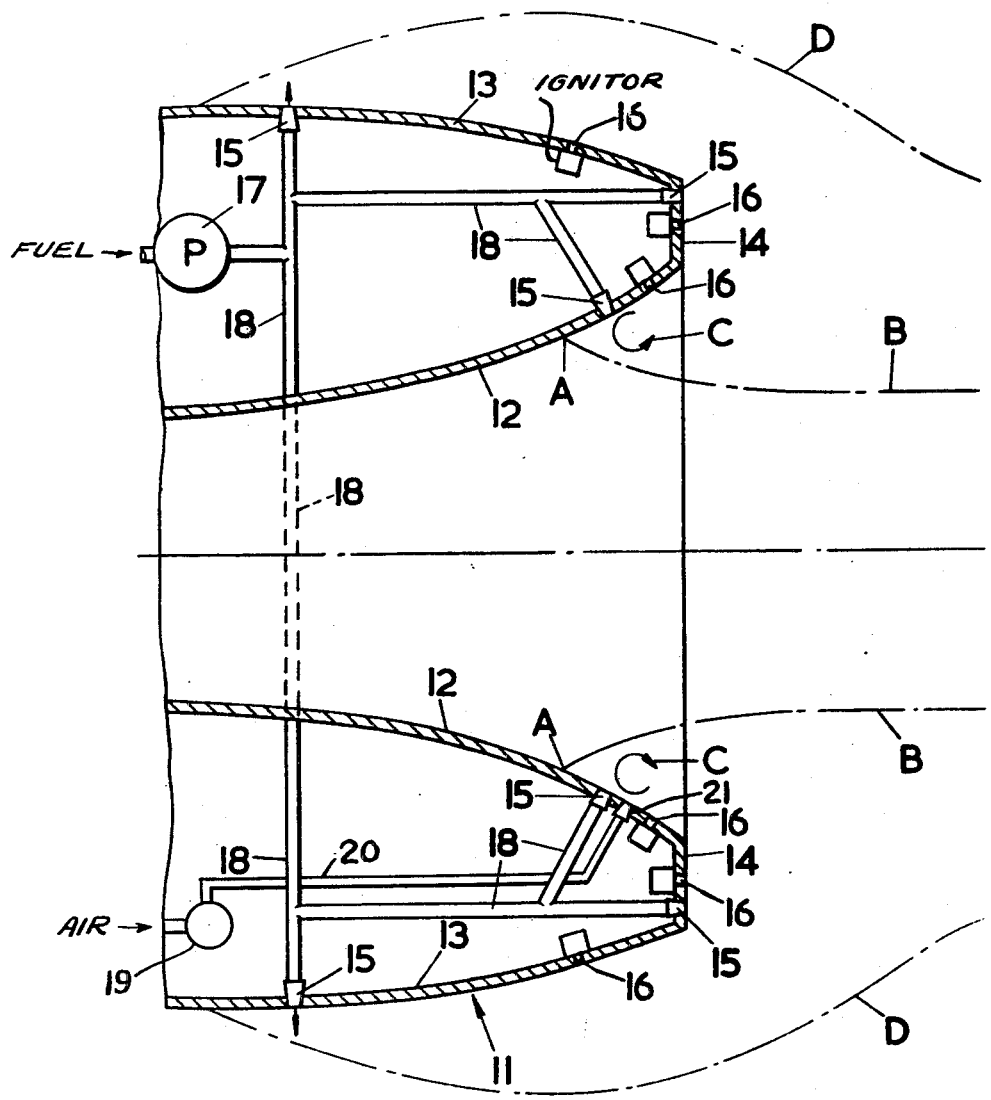

AIRCRAFT FLUID JET REACTION ENGINES

This invention relates to aircraft fluid jet reaction engines.

In one aspect the invention is concerned with aircraft having such engines and which are required to fly within a speed range extending from takeoff speed at least to transonic speeds and perhaps beyond to supersonic speed.

For aircraft having air-breathing fluid jet reaction engines and designed for transonic or supersonic flight speeds, it is known that the exit area of the engine exhaust nozzle best suited to high flight speeds is too large at lower flight speeds and in consequence, incurs at such low speeds a base drag due to overexpansion of the exhaust jet and/or separation of the flow from the inner surface of the exhaust nozzle.

Proposals have been made for providing a variable shape and exit area nozzle with a view to alleviating these difficulties, the configuration of the nozzle being changed for differing flight speeds so that the flow within it more nearly approaches an ideal. Such arrangements add weight, are complicated and therefore form a safety and economic liability.

Even if a variable exit area nozzle is used the datum outer base peripheral area of the main structure at its downstream end will usually remain constant as the exit area of the nozzle is reduced and hence there will be a corresponding increase in the base area between the nozzle and main structure which will have induced upon it low pressures and consequent base drag.

In the case where a fully variable exit area nozzle is not used there is a section of the inner wall of the nozzle, at its rearward end at least, at which overexpansion, and possibly separation, turbulence and recirculation occur.

Thus, in the case of the fixed exhaust nozzle or a variable area exhaust nozzle a region of low pressure is created which causes suction or base drag at the aft end of the engine nozzle.

With the advent of large high speed aircraft having large high powered jet engines the problem of aircraft noise has become of increasing importance to the extent that the frequency of aircraft takeoff and landing movements at airfields in residential areas is in some cases limited at least during the normal sleeping hours of say midnight until early morning.

It is known that a large proportion of aircraft noise results from the turbulent mixing of propulsive jets from engine exhaust nozzles with the local free-stream or low speed secondary airflows and it has previously been proposed to use acoustic shrouds containing sound insulating material which act to muffle or reflect those parts of the noise field which would otherwise radiate towards populated areas. The use of such shrouds is inhibited for practical reasons as they entail increased cost, weight and drag.

It is an object of the present invention to provide means whereby the base drag of an aircraft fluid jet reaction engine may be reduced to a lower level than would otherwise exist and the noise radiated from the engine efflux is reduced.

An aircraft air-breathing fluid jet reaction engine having an engine exhaust nozzle according to the present invention has means for supplying fuel to form a combustible mixture which is ignited and burnt at least in the region to the rear of the engine exhaust nozzle at which a low pressure and hence base drag would otherwise develop.

The fuel fed into said region and/or to the local atmosphere surrounding the aft region of the nozzle mixes and forms a combustible mixture which is ignited by the hot exhaust gases from the engine; the burning mixture has the effect of raising the pressure in the region to the rear of the engine nozzle and local structure and between the exhaust flow and the inner wall of the nozzle, where low pressure and base drag would otherwise develop, such that there is a reduction in base drag which may be such that an actual base thrust is obtained; the burning mixture also forms a layer of burning gases between the efflux from the jet engine and the local free-stream or secondary flow. This has the effect of lengthening the interface between the jet efflux and the local free-stream or secondary flow. Two interfaces will in fact now be present, one between the jet efflux and the burning gas mixture and one between the latter and the local free-stream or secondary flow. The overall effect is a reduction in turbulence intensity and hence a reduction of noise output. Furthermore the layer of burning gases will itself act as a muffler which by producing multiple reflections of sound from the jet efflux within the layer will reduce the noise to lower and less offensive frequencies or reflect it upwards.

Provision may be made for initiating and/or sustaining ignition of the combustible mixture in addition to the effect of the hot engine exhaust flow and may comprise igniter of glow plugs at the outer and/or aft surface of the structure surrounding the engine, and/or within the engine exhaust nozzle.

The fuel fed into the local atmosphere may be the same as that supplied to the propulsion engine or may have additives or be a different fuel such as low flash point gasoline which renders ignition more easily obtainable, and/or burning more intense or more efficient.

To promote burning within said low pressure region and particularly within the engine exhaust nozzle itself, fuel may be fed directly into said region either alone or with air, in addition to that fuel supplied upstream of said region.

The fuel fed into the local atmosphere surrounding the aft region of the nozzle may be injected into or through the boundary layer of the structure surrounding the engine and may have provision for inducing mixing of the fuel with the air such as swirl nozzles.

Injection of the fuel will be far enough upstream of the base drag region to give sufficient time for a correct fuel air mixture to develop.

Thus, in the case of a front-fan jet engine installation, fuel injection may conveniently be from the struts supporting the fan cowl and from positions possibly outside the engine boundary layer.

In cases where the reduction of jet efflux generated noise is of prime importance the fuel may be injected and burnt to form a layer of burning gases beneath the jet efflux whereby noise is prevented from being radiated downwards.

An example of the invention is illustrated by the accompanying diagrammatic drawing which is a cross section side elevation of the rear section of an aircraft air-breathing jet reaction engine axisymmetric exhaust nozzle.

The rear section of the engine exhaust nozzle is shown at 11 and has inner, outer and end walls 12, 13, and 14 respectively. Three annular series of fuel injector nozzles 15, are provided in the inner wall 12, the outer wall 13 and the end wall 14. Ignitor plugs 16 are located at the surface of the inner, outer and end walls 12, 13, 14. A fuel pump 17 has fuel lines 18 leading to the fuel nozzles 15.

At flight speeds below the aircraft speed for which the duct is designed, e.g. at transonic and lower air speeds for a supersonic aircraft, the exhaust flow from the duct tends to break away from the inner wall 12 at A, A and then forms a gas stream having a boundary as shown by the dotted lines B. As a result there is a region of low pressure recirculation, as shown by the arrows C between the inner wall 12 and the exhaust jet which causes base drag. Even without this circulation, a low pressure will develop immediately downstream of the end wall 14, which will also cause base drag.

With the arrangement according to the invention fuel is supplied by the pump 17 through the fuel lines 18 and nozzles 15 and issues into and possibly through the boundary layer at the duct outer wall 13 into the local atmosphere surrounding the aft region of the nozzle into the region to the rear of the end wall 14 and into the region of low pressure recirculation C where it forms a combustible mixture within the region shown generally by chain dotted boundary lines B and D.

This mixture is ignited by contact with the hot exhaust gas stream B and/or by the action of the igniter plugs 16. The resulting pressure rise following ignition raises the pressure in the region of C, C and downstream of the end wall 14, 14, with a consequent reduction in base drag or even the provision of actual thrust.

To avoid shocks and/or separations due to fuel injection, the fuel may be directed by nozzles such as 15 tangentially with or obliquely to the walls 13 but in practice however, the production of shock compression may increase the efficiency of base burning and so be a desirable feature in which case fuel injection will be normal to the flow as shown.

It may be that combustion will be desired over the outside surfaces 13, 13 so that afterbody drag at this region is also overcome and base thrust increased.

Provision may be made for injecting air through nozzles similar to the fuel nozzles 15 to form a combustible mixture with the injected fuel and may comprise an air pump 19, air line 20 and air directing nozzle 21.

I claim:

1. An aircraft fluid jet reaction engine comprising: an engine exhaust nozzle, at least one supply line for fuel, fuel directing means terminating said fuel supply line at the outer wall surface of the downstream end region of said exhaust nozzle, and means for supplying fuel through said supply line and said fuel directing means into the local atmosphere externally of said exhaust nozzle to form a combustible mixture which is ignited by contact with the hot gas efflux from the engine exhaust nozzle and burnt externally of said gas efflux.

2. An engine as claimed in claim 1 having a rear end wall structure at the downstream end of said exhaust nozzle,
   fuel-directing means supported in said structure for directing fuel to the rear of said structure,
   fuel supply lines terminating at said fuel-directing means,
   further structure forwards of said end wall structure having further fuel-directing means for directing fuel into the local atmosphere adjacent said further structure, and,
   further fuel supply lines terminating at said further fuel-directing means.

3. An engine as claimed in claim 1 having exhaust nozzle fuel-directing means supported in said engine exhaust nozzle adjacent its downstream end for directing fuel into the region bounded by said nozzle, and,
   fuel supply lines terminating at said exhaust nozzle fuel-directing means.

4. An engine as claimed in claim 1 having supply lines for air,
   air-directing means terminating said air supply lines in the region of said fuel-directing means, and,
   means for supplying air through said air supply lines and said air-directing means to mix with the fuel issuing from said fuel-directing means.

5. An engine as claimed in claim 1 and having igniter means supported adjacent said fuel-directing means and operative to supplement the ignition effect of the hot gas efflux from the engine exhaust nozzle to initiate and maintain combustion of said combustible mixture.

6. An engine as claimed in claim 2 having exhaust nozzle fuel-directing means supported in said engine exhaust nozzle adjacent its downstream end for directing fuel into the region bounded by said nozzle, and, fuel supply lines terminating at said exhaust nozzle fuel-directing means.

7. An engine as claimed in claim 6 having supply lines for air, air-directing means terminating said air supply lines in the region of said fuel-directing means, and, means for supplying air through said air supply lines and said air-directing means to mix with the fuel issuing from said fuel-directing means.

8. An engine as claimed in claim 7 and having igniter means supported adjacent said fuel-directing means and operative to supplement the ignition effect of the hot gas efflux from the engine exhaust nozzle to initiate and maintain combustion of said combustible mixture.